US008365674B2

(12) United States Patent
Banwart (10) Patent No.: US 8,365,674 B2
(45) Date of Patent: Feb. 5, 2013

(54) INTERMODAL TRANSPORTATION SYSTEM WITH MOVABLE LOADING RAMPS AND LOCAL HYBRID DELIVERY (76) Inventor: Donald D. Banwart, Fort Scott, KS (US)

( * ) Notice: Subject to any disclaimer, the term of this patent is extended or adjusted under 35 U.S.C. 154(b) by 308 days.

(21) Appl. No.: 12/895,489

(22) Filed: Sep. 30, 2010

(65) Prior Publication Data

US 2011/0072999 A1   Mar. 31, 2011

Related U.S. Application Data (60) Provisional application No. 61/247,397, filed on Sep. 30, 2009.

(51) Int. Cl.
*B65G 67/00* (2006.01)

(52) U.S. Cl. ............ 105/3; 105/34.1; 105/4.2; 105/159; 105/182.1; 414/340; 180/14.1; 180/14.2; 410/56; 280/418.1

(58) Field of Classification Search ............... 105/4.1, 105/4.2, 4.3, 34.1, 159, 182.1, 199.1, 425, 105/3, 4.4, 34.2, 176, 184; 414/341, 343, 414/401, 809, 340; 180/14.1, 14.2; 280/418.1, 280/476.1; 410/53, 56, 58, 64
See application file for complete search history.

(56) References Cited

U.S. PATENT DOCUMENTS

| | | | | |
|---|---|---|---|---|
| 2,044,767 A | * | 6/1936 | Besler | .............. 105/135 |
| 3,019,917 A | | 2/1962 | Ajero | |
| 3,153,489 A | | 10/1964 | Leavengood et al. | |
| 3,448,693 A | | 6/1969 | Graham | |
| 3,578,096 A | * | 5/1971 | Pearson | .............. 180/14.6 |
| 3,995,876 A | | 12/1976 | Ronne | |
| 4,111,451 A | * | 9/1978 | Pinto | .............. 280/408 |
| 4,179,997 A | | 12/1979 | Kirwan | |
| 4,375,343 A | | 3/1983 | Butler | |
| 4,385,857 A | | 5/1983 | Willetts | |
| 4,413,836 A | | 11/1983 | Losh | |
| 4,416,571 A | * | 11/1983 | Krause | .............. 410/53 |
| 4,480,554 A | | 11/1984 | Brodeur et al. | |
| 4,669,391 A | | 6/1987 | Wicks et al. | |
| 4,685,399 A | | 8/1987 | Baker | |
| 4,841,872 A | | 6/1989 | Wicks et al. | |
| 4,955,144 A | | 9/1990 | Lienard et al. | |
| 4,989,518 A | | 2/1991 | Kealey et al. | |
| 5,017,064 A | | 5/1991 | Kirwan et al. | |
| 5,020,445 A | * | 6/1991 | Adams, Jr. | .............. 105/4.1 |
| 5,129,327 A | | 7/1992 | Snead | |
| 5,172,819 A | | 12/1992 | Daugherety, Jr. et al. | |
| 5,246,081 A | * | 9/1993 | Engle | .............. 180/19.2 |

(Continued)

OTHER PUBLICATIONS

"PCT Search Report & Written Opinion", PCT/US10/50995, (Dec. 1, 2010).

*Primary Examiner* — Mark Le
(74) *Attorney, Agent, or Firm* — Law Office of Mark Brown, LLC; Mark Brown; Christopher M. DeBacker (57) ABSTRACT

An intermodal transportation system having interconnected railcars adapted for transporting interconnected freight trailers where the freight trailers remain connected while being transported on the railcars. Individual trailers are assembled into trailer assemblies at an assembly area. Trailers containing freight are assembled into trailer assembles using specialized dollies. A preferred embodiment includes using a self-powered dolly having tires and mounting a fifth-wheel pickup plate and a ring coupler for engaging the kingpin of a trailer. Multiple dolly-trailer assemblies are connected together to form a trailer assembly. A self-powered movable ramp is positioned at an end of the railcar assembly and a tractor pulls the trailer assembly onto a railcar assembly by driving up a self-powered movable ramp and across the top of the railcars.

9 Claims, 13 Drawing Sheets

U.S. PATENT DOCUMENTS

| | | |
|---|---|---|
| 5,407,309 A | 4/1995 | Hesch et al. |
| 5,540,157 A | 7/1996 | Andersson et al. |
| 5,601,030 A * | 2/1997 | Brouillette ............. 105/159 |
| 6,123,029 A | 9/2000 | Mobley |
| 6,460,468 B1 * | 10/2002 | Mobley ............. 105/4.2 |
| 6,599,082 B2 | 7/2003 | Lawrence |
| 6,718,886 B2 * | 4/2004 | Engle ............. 105/355 |
| 6,736,071 B2 | 5/2004 | Engle |
| 7,093,682 B2 * | 8/2006 | Cooper ............. 180/14.2 |
| 7,255,047 B1 * | 8/2007 | Coslovi et al. ............. 105/4.1 |

\* cited by examiner

INTERMODAL TRANSPORTATION SYSTEM WITH MOVABLE LOADING RAMPS AND LOCAL HYBRID DELIVERY

CROSS-REFERENCE TO RELATED APPLICATION

This application claims priority in U.S. Provisional Patent Application No. 61/247,397 filed Sep. 30, 2009, which is incorporated herein by reference.

BACKGROUND OF THE INVENTION

1. Field of the Invention

The present invention relates generally to freight distribution systems, and in particular an intermodal transportation system utilizing flat railcars and local hybrid vehicle delivery of trailers and container-on-chassis trailers.

2. Description of the Related Art

Intermodal transportation of freight consists of the movement of individual freight containers utilizing different modes of transportation. The advantage of this method consists of increased efficiency in transportation of freight. Efficiencies are manifested in both the physical movement of the freight containers, and economical savings of bulk transportation of freight. As such, numerous approaches have been taken to maximize the physical and economic efficiencies of intermodal transportation. In particular, movement of freight utilizing a combination of railroad cars and tractor-trailers and container-on-chassis trailers suitable for travel on interstate highways has been the focus of much attention.

Two basic methods of moving freight by both railway and roadway consist of using either a semi-trailer and railroad flatcar combination, or a semi-trailer and bogie combination. A trailer and flatcar combination consists of a trailer having a kingpin positioned piggyback-style on the top of a conventional flatcar. The trailer is positioned on the flatcar at a transition point utilizing either handling equipment (e.g., saddle or swing crane, or forklift) or driven onto the railroad car using a ramp and tractor. Once positioned on the flatcar, the kingpin of the trailer is typically secured to a coupling device having a fifth wheel for securely engaging the trailer to the flatcar. Multiple flatcars can be assembled into a train for efficient movement of freight. An advantage of using a flatcar for transporting a trailer permits the compression and tension forces encountered during train movement to be transferred through the flatcar. Moreover, many variations of trailers can be transported using this method of moving freight, and the conventional flatcar can be assembled into a train for transportation along conventional railway routes.

Currently, loading of flatcars with handling equipment requires decoupling of the trailer from the tractor, engagement and disengagement of the handling equipment during the transition period, and secure engagement of the trailer with the flatcar. The steps are completed in reverse for unloading the flatcar. This process is time consuming and requires expensive and complex handling equipment at each transition point. Moreover, the trailers and freight can become damaged during the transition due to collisions, dropping, and the shifting of freight. Loading trailers onto flatcars utilizing ramps positioned at the end or alongside the flatcar allow the tractor-trailer to drive up and onto the flatcar for deposition of the trailer. This method is accomplished by either driving the tractor-trailer onto the flatcar tractor first, or by backing the tractor-trailer onto the flatcar trailer first. Because each trailer is typically secured by its kingpin to the flatcar, trailers can only be loaded one at a time in a circus-loading fashion. Although driving the trailer onto the flatcar avoids the hazards of using handling equipment to move the trailer, the circus-loading process is time consuming resulting in decreased efficiency during physical movement of the freight.

A trailer and bogie combination consists of a modified semi-trailer adapted for engaging a specialized railway bogie. A trailer used in this approach differs from that employed above because instead of a conventional flatcar handling the rail compression and tension forces, a trailer with structural enhancements, and modified undercarriage manages the forces of the train. Here, assembly of a railroad car consists of a conventional tractor first engaging the frame of the aft portion of the trailer with a suitable railway bogie. Upon disengagement of the tractor from the trailer, the fore portion of the trailer is engaged with a suitable railway bogie by either its kingpin or the frame. Additional equipment necessary for assembly of this type of railroad car typically consists of ramps, or assist mechanisms built into the enhanced trailer. This method of moving freight is economically attractive because the elimination of a conventional flatcar from the railroad car assembly decreases the overall weight of the individual railroad car thereby decreasing the weight the locomotive needs to move. However, the disadvantages of this method of freight transportation over the conventional flatcar method relate to the weight of the trailer associated with its structural enhancements. Because such trailers typically have more steel in them to handle forces encountered during train movement, and sometimes have components enabling the trailer to travel on both the roadway or railway, the higher tare weight of the trailer limits the amount of weight the trailer is permitted to transport over a roadway. Moreover, such railroad cars typically require dedicated rail service because they are not compatible with other rail traffic due to their unique composition, and inability of the bogie couplings to manage usual train forces.

Heretofore there has not been available an inter-modal transportation system with the advantages and features of the present invention.

BRIEF SUMMARY OF THE INVENTION

An intermodal transportation system is provided having interconnected railcars adapted for transporting interconnected freight trailers where the freight trailers remain connected while being transported on the railcars. Individual trailers are assembled into trailer assemblies at an assembly area. Trailers containing freight are assembled into trailer assembles using specialized dollies. A self-powered dolly having tires and mounting a fifth-wheel pickup plate and a ring coupler for engaging the kingpin of a trailer. Multiple dolly-trailer assemblies are connected together to form a trailer assembly. A self-powered movable ramp is positioned at an end of the railcar assembly and a tractor pulls the trailer assembly onto a railcar assembly by driving up a self-powered movable ramp and across the top of the railcars.

A railcar assembly consists of two or more railway spine cars having a flat deck interconnected together in a semi-permanent fashion using a positive slack-free connection. Pivot plates span the gaps between individual railcars of the assembly allowing the trailer assembly to drive across the railcar assembly and to allow the railcars to articulate as they encounter turns in the track. A channel running the length of each railcar allows secure attachment of the dollies and trailers to the railcar during transportation.

Two or more railcar assemblies may be connected together using conventional railway couplings. The railcar assemblies are either assembled into their own train, or integrated into a train having conventional railcars. The railcar assemblies are pulled by a locomotive to another assembly area where the railcar assemblies are segregated onto a siding. The trailer assemblies are driven off of the railcars in a manner similar to the loading procedure mentioned above, and the individual trailers are delivered to their local destination. In addition, two or more trailers may remain connected by dollies and delivered by a single tractor to their local destination.

BRIEF DESCRIPTION OF THE DRAWINGS

The drawings constitute a part of this specification and include exemplary embodiments of the present invention and illustrate various objects and features thereof.

DETAILED DESCRIPTION OF THE PREFERRED EMBODIMENT

I. Introduction and Environment

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Intermodal Transportation System 2

Figure 15:
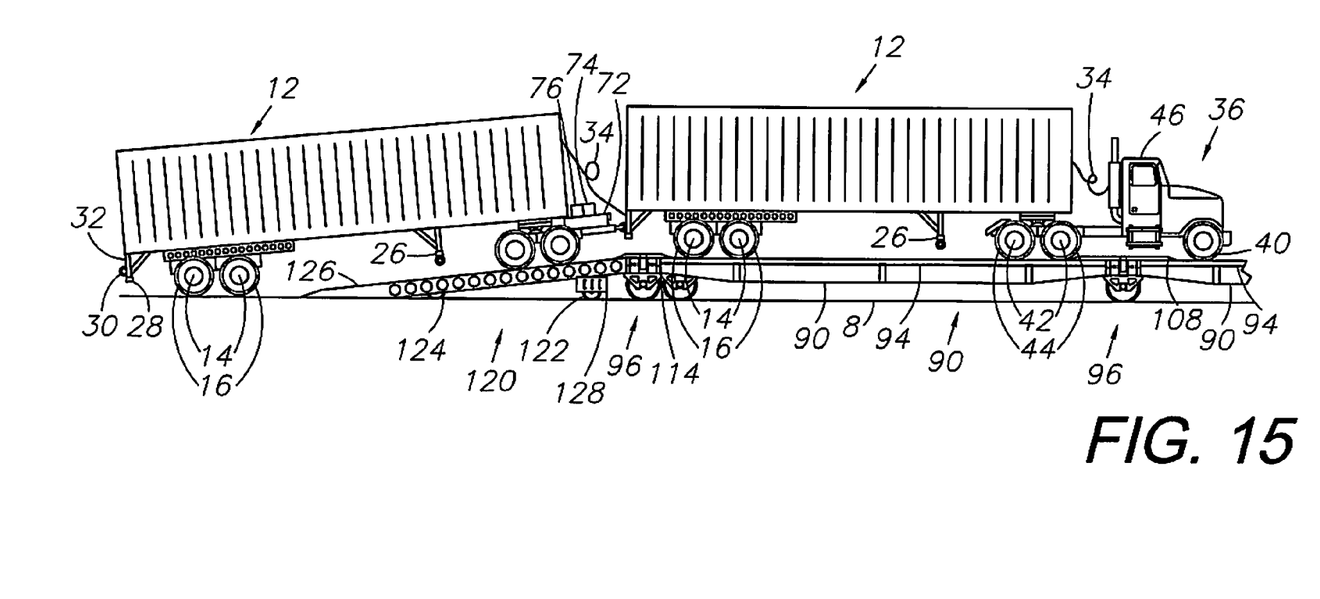
FIG. 15 is a side elevational view of a tractor trailer assembly loading upon the railcar assembly embodying principles of the present invention.
Figure 19:
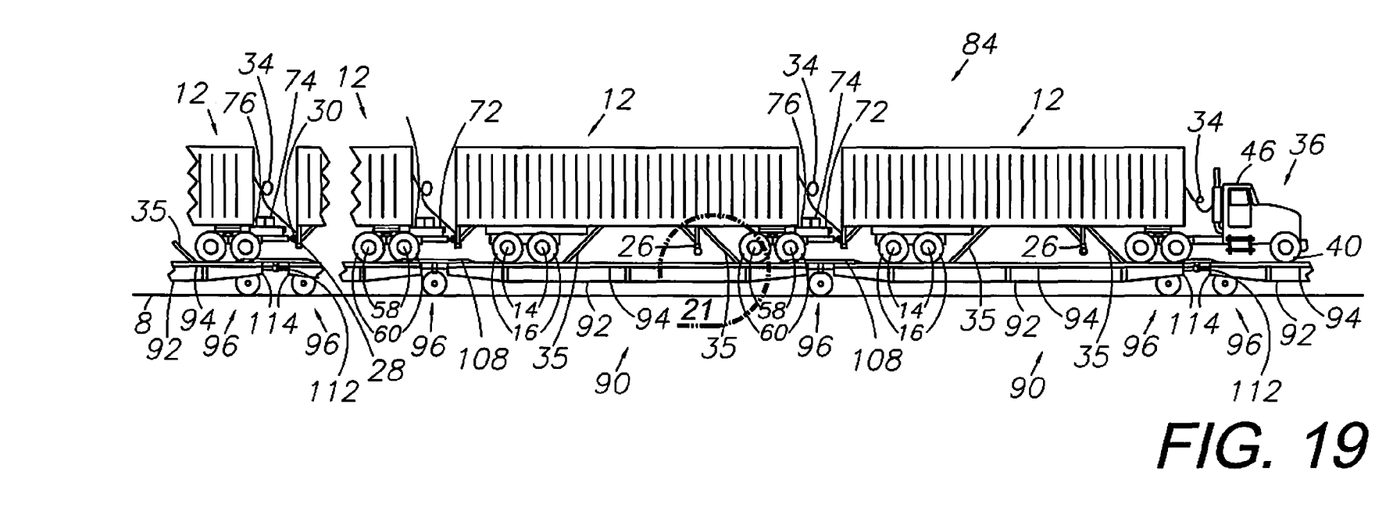
FIG. 19 is a side elevational view of a tractor trailer assembly secured to railcar assemblies embodying principles of the present invention.
Figure 20:
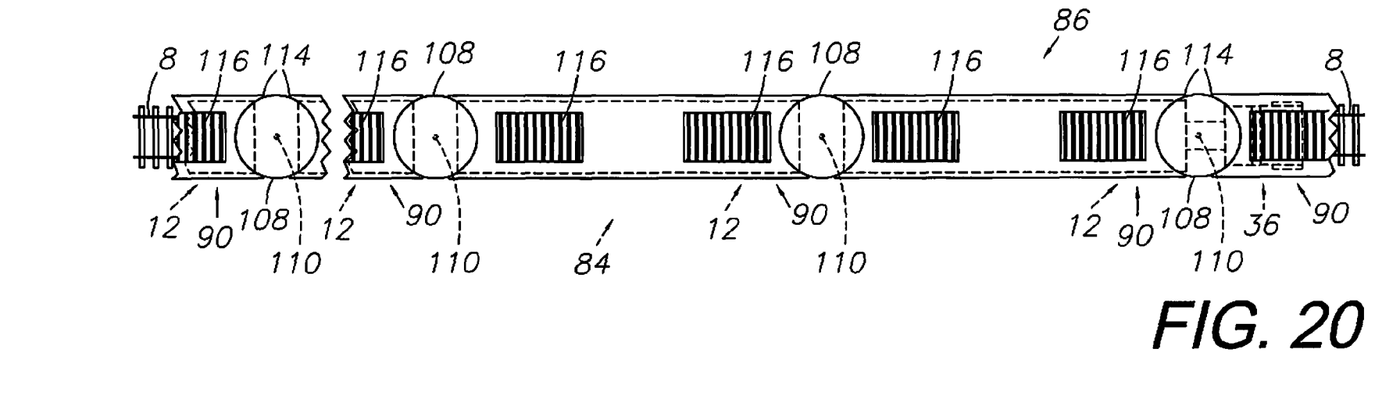
FIG. 20 is a plan view of the railcar assembly of FIG. 19 showing the cross rods of the tie-down assemblies.

Referring to the drawings, FIGS. 1-20 show an intermodal transportation system 2 embodying the principles of the present invention. The system 2 generally consists of movement of freight using tractor 36 and trailer 12 assemblies and specialized railroad flatcars 90. The intermodal transportation system 2 assembly area 4 consists of a main-line railway track 6 with adjacent side tracks 8. The railway track 6 and side track 8 consists of train rails in parallel relation suitably spaced apart for receiving the flanged wheels of the locomotive (not shown) and railroad flatcars 90. The side track 8 has a roadway 10 between the rails and along the periphery of the tracks that is paved up to the rail head level permitting maneuvering of the tractors 36, dollies 56 and trailers 12 within the assembly area 4. Trailers 12 containing freight are delivered to the assembly area 4 by conventionally-powered, and hybrid-powered tractors 36. A plurality of trailers 12 headed to the same railroad destination are assembled together into dolly-trailer assemblies 82 by combining trailers 12 and specialized dollies 56 (FIGS. 2-5). The dolly-trailer assemblies 82 are connected to a tractor-trailer assembly 80 consisting of a tractor 36 and trailer 12 (FIG. 15). The trailer assemblies 84 are driven up and on the deck 94 of specialized railroad flatcars 90 which have been assembled into two or more semi-permanent railcar assemblies 86. The trailer assembly 84 is secured to the railcars 90 by tie-downs 35 and remain connected together, during transportation to their railroad destination (FIG. 19). Multiple railcar assemblies 86 with trailer assemblies 84 attached may be assembled into a train. A locomotive transports the train down the line until they reach their destination. The railcar assemblies 86 are separated from the train and moved to a side track 8 for unloading. The trailer assemblies 84 are driven off of the railcars 90 into the assembly area 4. The trailer assemblies 84 are separated into individual trailers 12 whereby additional on-site tractors 36 deliver one or more trailers 12 to their local destination. At each intermodal assembly area 4, assembly and disassembly of trailer assemblies 84 may be accomplished using the tractors 36.

III. Trailer 12, Dolly 56, and Tractor 36 Assembly

Figure 1:
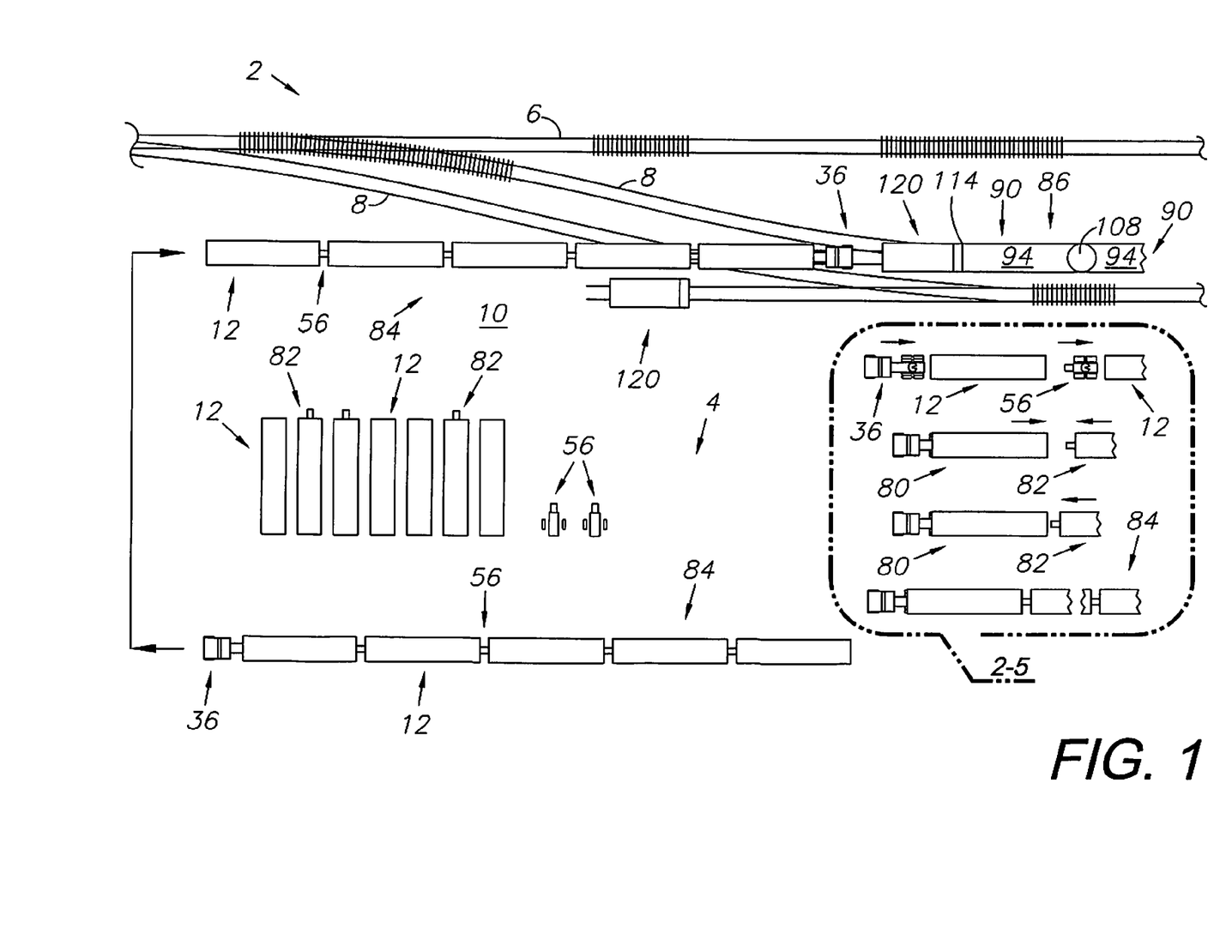
FIG. 1 is a plan view of an intermodal transportation system embodying the principles of the present invention.
Figure 2:
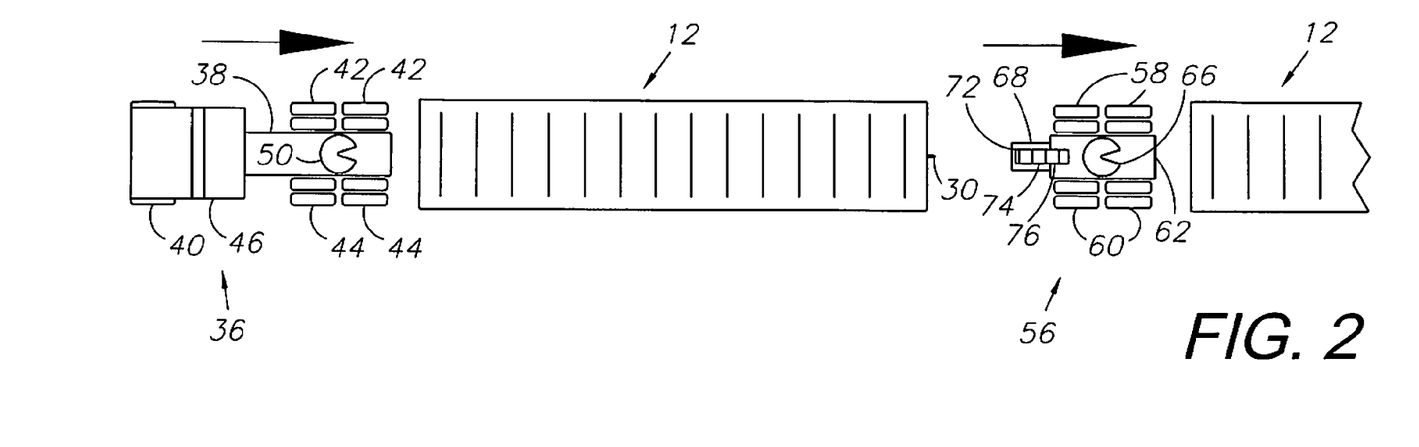
FIG. 2 is an enlarged plan view of a tractor-dolly-trailer assembly procedure embodying principles of the present invention taken generally within circle 2-5 in FIG. 1 whereby the tractor is backed into a trailer, and a dolly is backed into a trailer.
Figure 11:
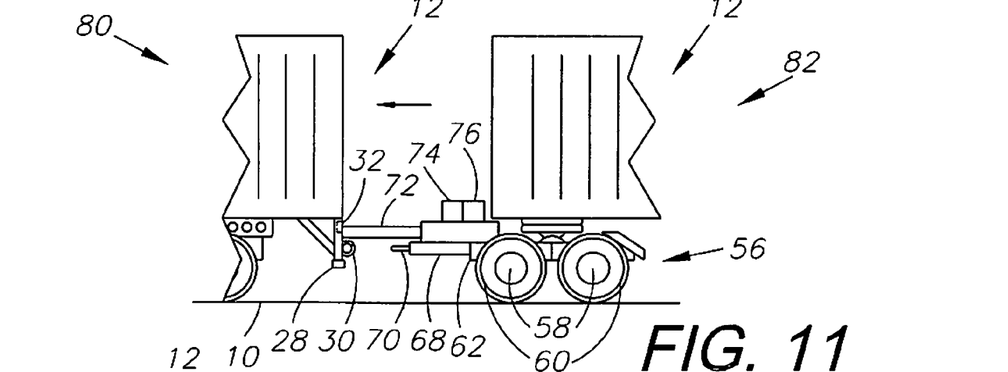
FIG. 11 is an enlarged side elevational view of the dolly assembly taken generally within circle 11 in FIG. 8.
Figure 12:
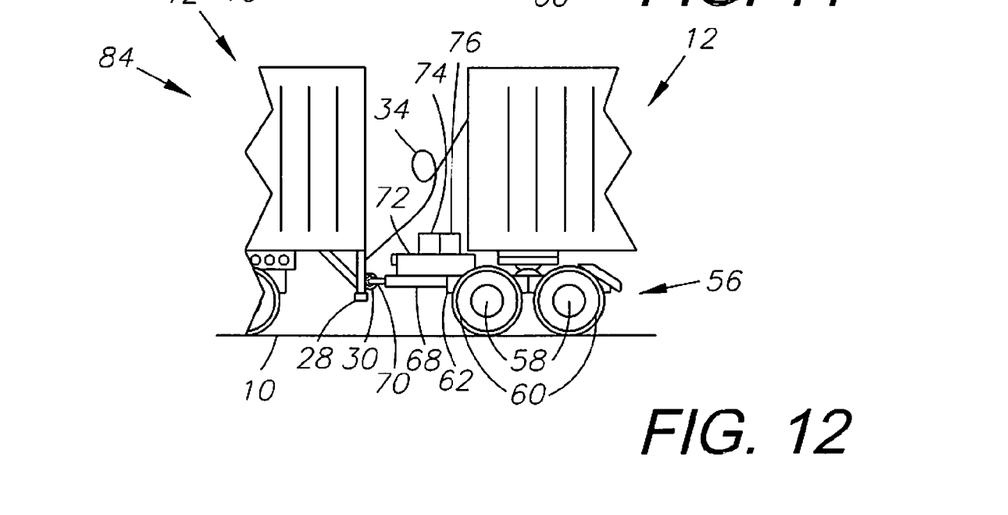
FIG. 12 is an enlarged side elevational view of the dolly assembly taken generally within circle 12 in FIG. 9.
Figures 13, 16, 17, 18:
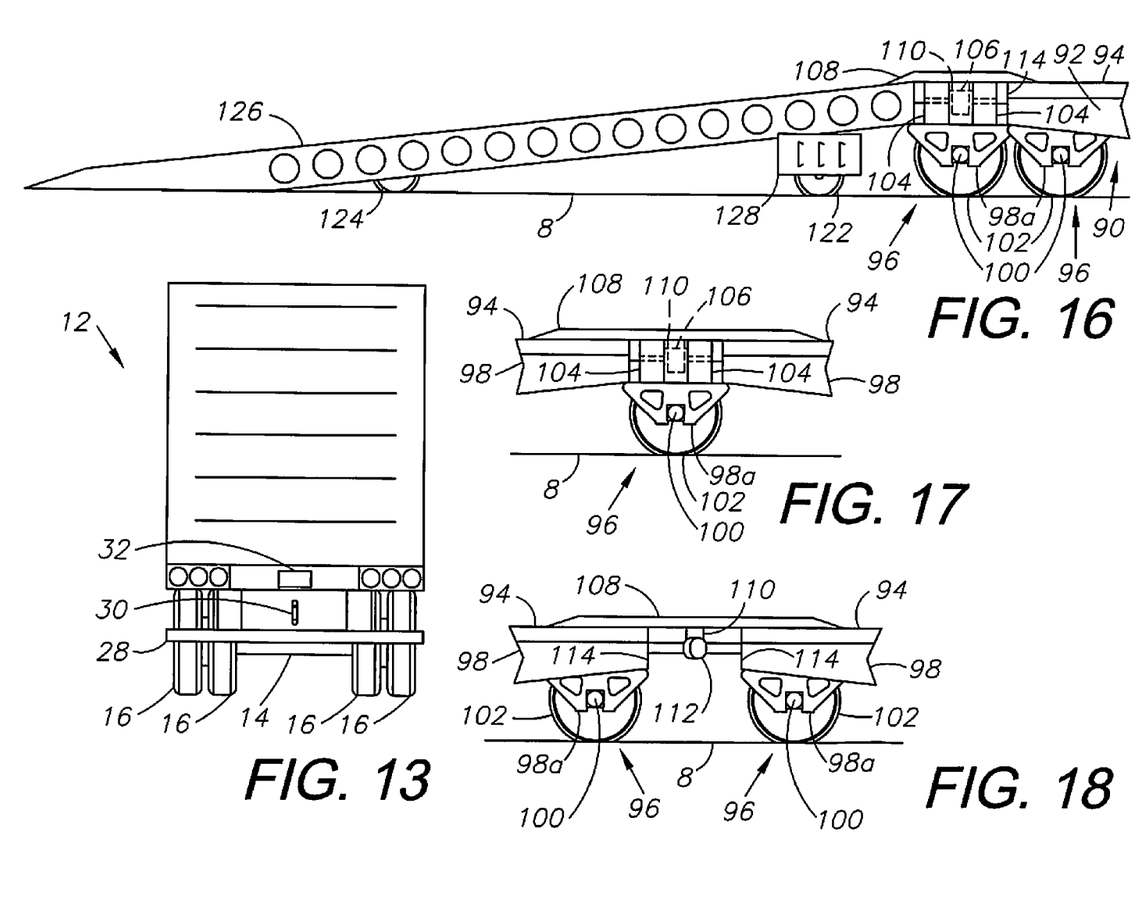
FIG. 13 is an elevational view of the rear of a trailer embodying principles of the present invention.
FIG. 16 is an enlarged view of the movable railcar loading ramp taken generally within circle 16 in FIG. 14.
FIG. 17 is an enlarged view of a railcar bogie and a railcar interconnection taken generally within circle 17 in FIG. 14.
FIG. 18 is an enlarged view of the coupling between railcar assemblies taken generally within circle 18 in FIG. 14.

Referring generally to FIGS. 2-12, the assembly of trailers 12 to a tractor 36 is shown and described. Referring to FIG. 2, a conventional trailer 12 suitable for interstate highway transportation of freight consists of a pair of axle assemblies 14 with tires 16 rotatably disposed at a rear end, and a bearing plate 20 with a kingpin 22 at a front end. The trailer 12 has landing gear 26 depending therefrom for supporting the trailer 12 when it is unattached from a tractor 36 or a dolly 56. A rear bumper 28 has a pintle hook 30 for receiving the ring coupling 70 of a dolly 56 and a receiver 32 for receiving the end of a hydraulic jack 72 (FIG. 13). While a conventional trailer 12 is shown and described, the trailer 12 can be substituted with a container on chassis assembly (not shown). A hybrid-powered tractor 36 has a frame 38 with an underside mounting front tires 40 and a pair of axle assemblies 42 with tires 44. The top of the frame 38 mounts a cab 46 at the front end and a hybrid powered engine (not shown) for powering the tractor 36. A fifth wheel pickup plate 50 at the rear end engages the kingpin 22 of a trailer 12. A specialized dolly 56 suitable for interstate highway transportation is provided for connecting trailers 12 into trailer assemblies 84. The dolly 56 consists of one or two axle assemblies 58 with tires 60 mounting a frame 62. The dolly 56 is independently self-powered by an electrical motor 65 operably connected to the axle assembly 58. The electrical motor 65 is powered by a battery 64, or alternatively by other power supplies such as gasoline-powered or natural gas powered motors. When the dolly 56 is connected to a trailer 12 the battery is recharged from electrical power provided by the tractor 36. The rear of the frame 62 has a fifth wheel pickup plate 66 for engaging the kingpin 22 of a trailer 12. A drawbar 68 extends forward from the frame 62 and has a ring coupling 70 on its forward end for engaging the pintle hook 30 of a trailer 12. A hydraulic jack 72, such as the model AJ-45 jack manufactured by Equalizer Systems of Elkhart, Ind. is mounted on top of the drawbar 68 and has a stroke length that extends forward past the ring coupling 70 for engaging the receiver 32 in the rear bumper 28 of the trailer 12. A power supply such as a battery 74 and hydraulic pump 76 provide independent operation of the hydraulic jack 72 without a need for a power connection to the tractor 36.

Figure 3:
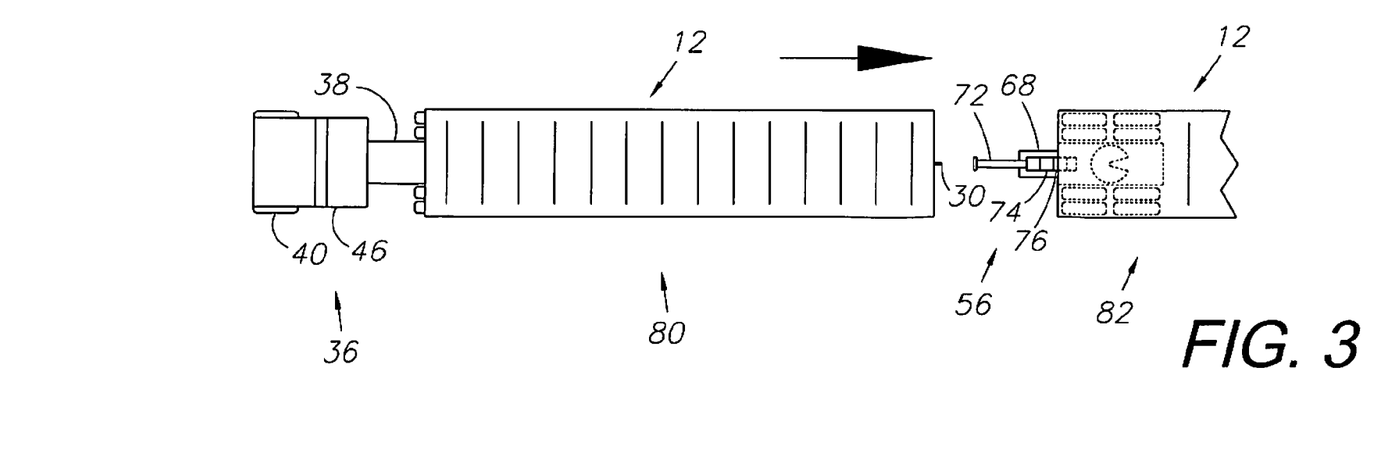
FIG. 3 is an enlarged plan view of a tractor-dolly-trailer assembly procedure taken generally within circle 2-5 in FIG. 1 whereby the tractor-trailer assembly is moved toward the dolly-trailer assembly.
Figure 4:
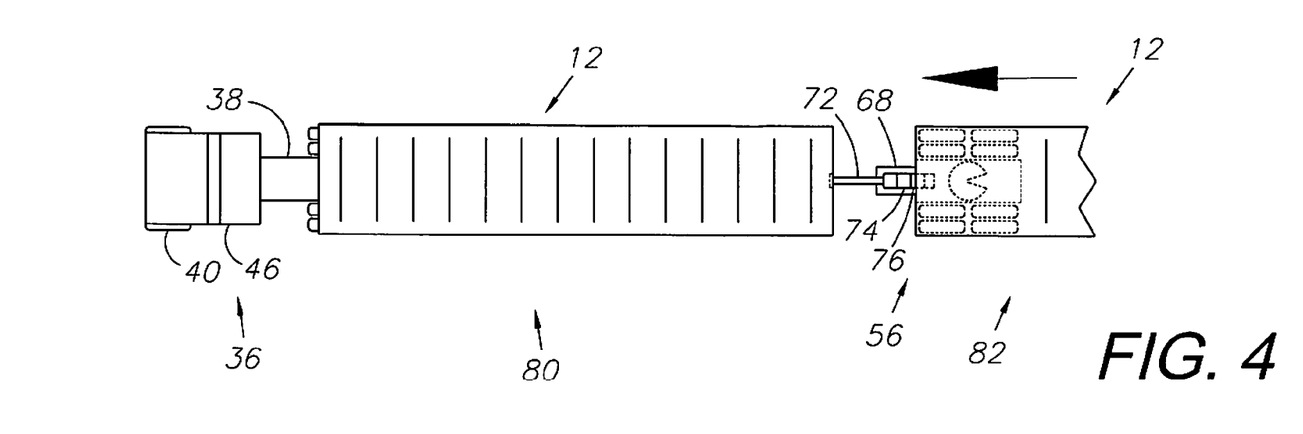
FIG. 4 is an enlarged plan view of a tractor-dolly-trailer assembly procedure taken generally within circle 2-5 in FIG. 1 whereby the dolly-trailer assembly is drawn toward the tractor-trailer assembly.
Figure 5:
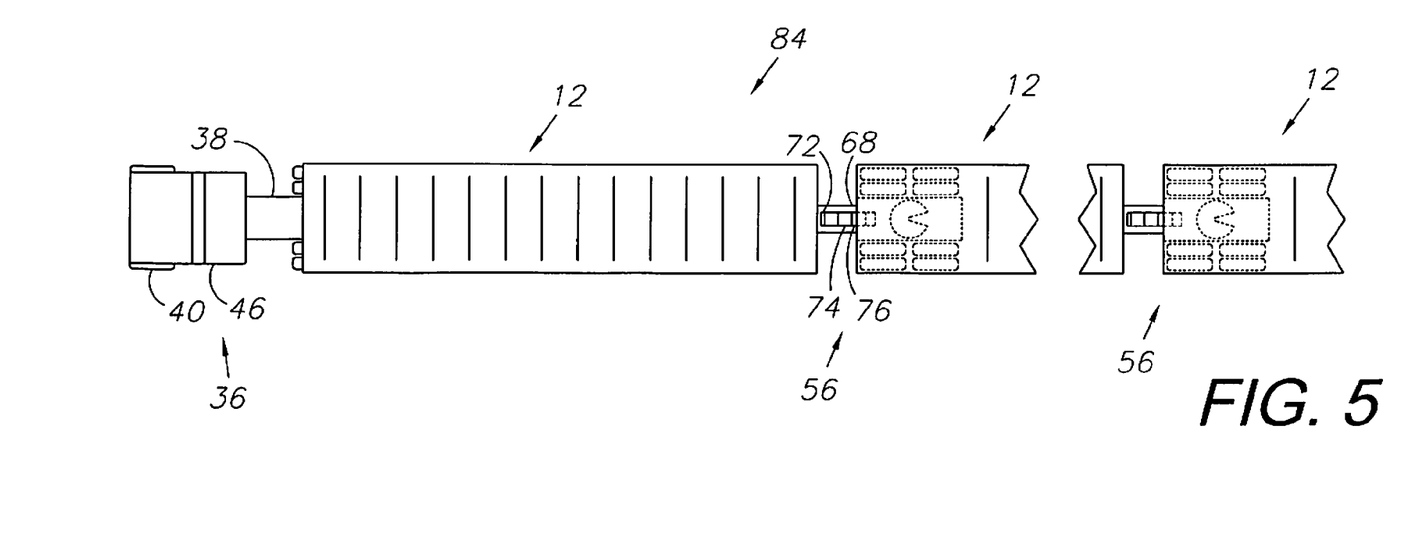
FIG. 5 is an enlarged plan view of a tractor-dolly-trailer assembly procedure taken generally within circle 2-5 in FIG. 1 where a series of dolly-trailer assemblies are connected together to a tractor-trailer assembly.
Figure 6:
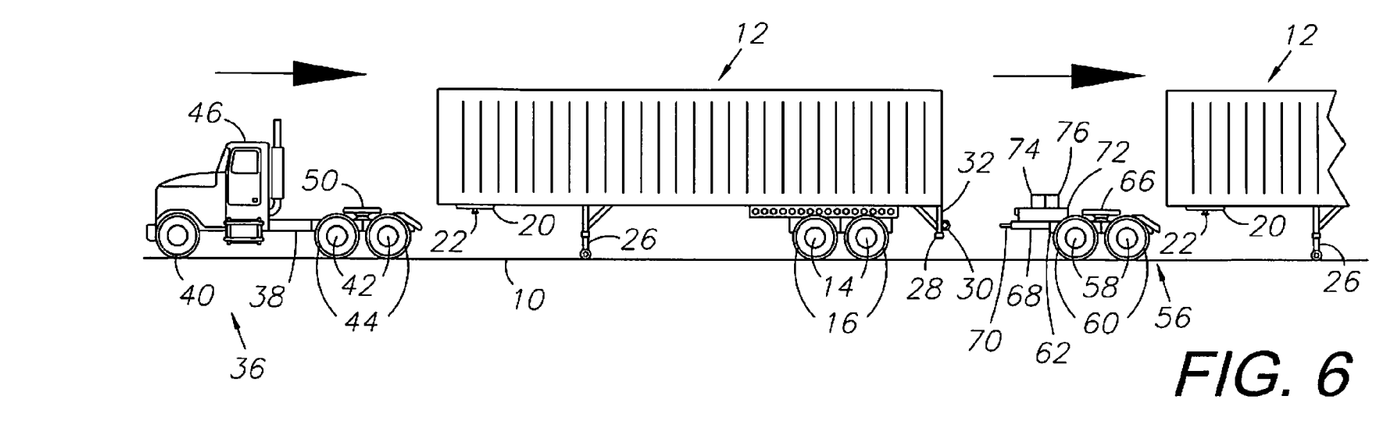
FIG. 6 is a side elevational view of a tractor-dolly-trailer assembly procedure embodying principles of the present invention shown in FIG. 2.
Figure 7:
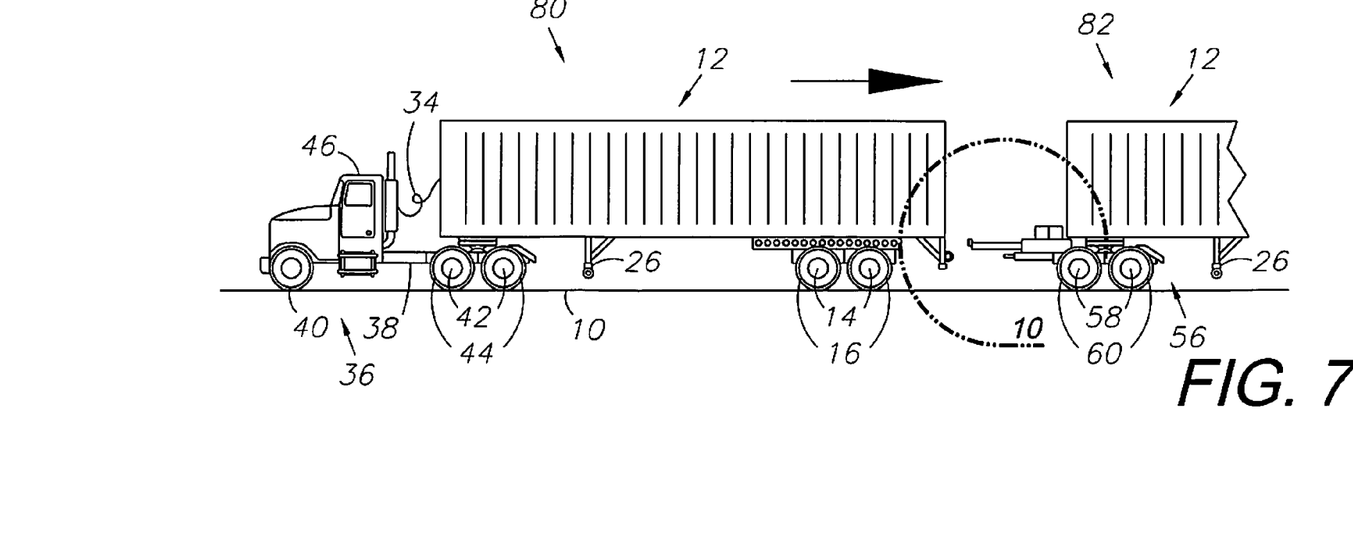
FIG. 7 is a side elevational view of a tractor-dolly-trailer assembly procedure embodying principles of the present invention shown in FIG. 3.
Figure 8:
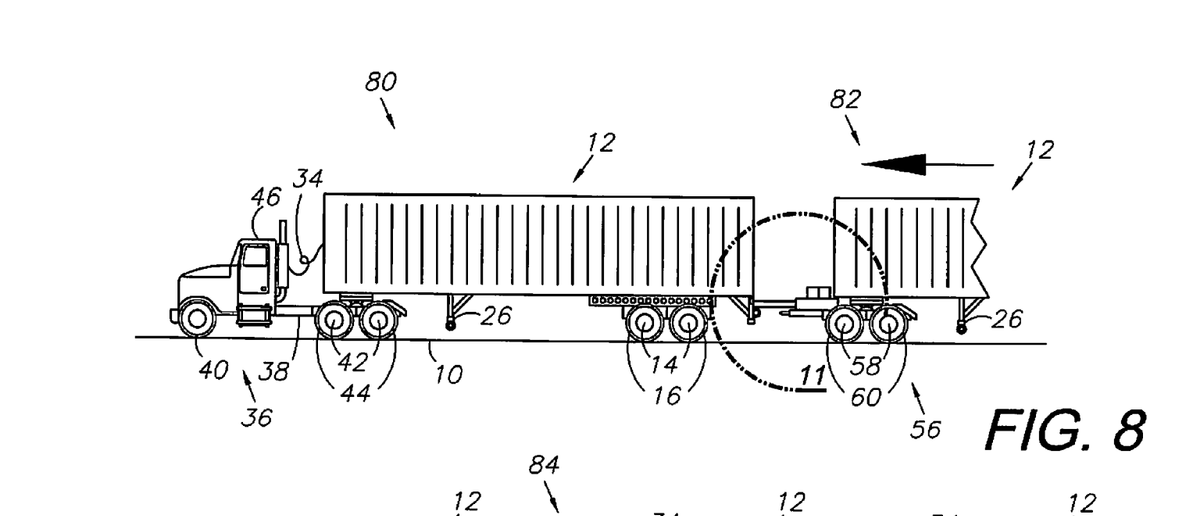
FIG. 8 is a side elevational view of a tractor-dolly-trailer assembly procedure embodying principles of the present invention shown in FIG. 4.
Figure 9:
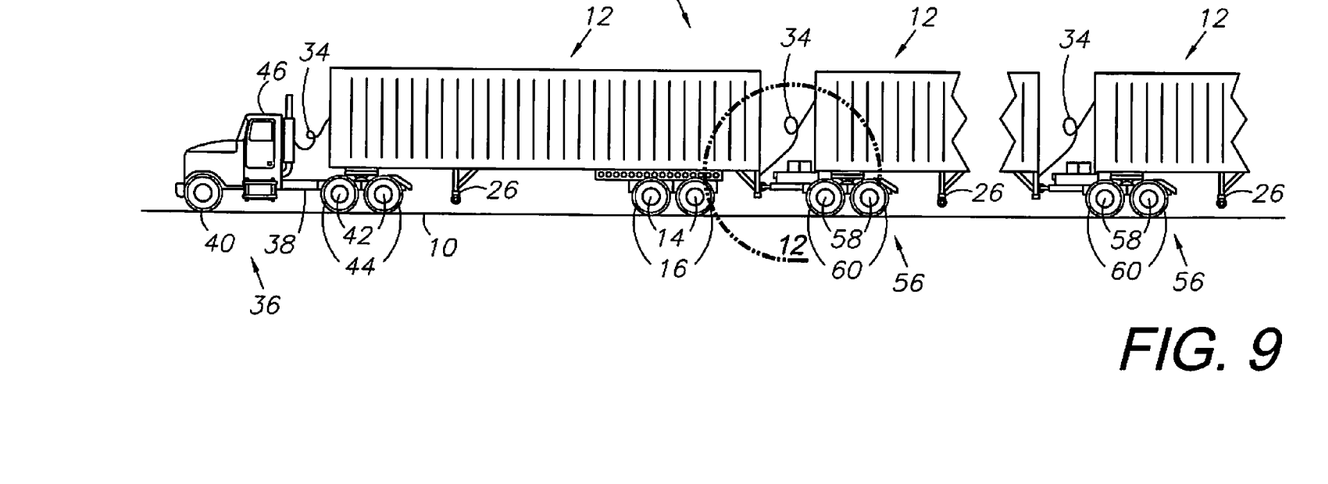
FIG. 9 is a side elevational view of a tractor-dolly-trailer assembly procedure embodying principles of the present invention shown in FIG. 5.
Figure 10:
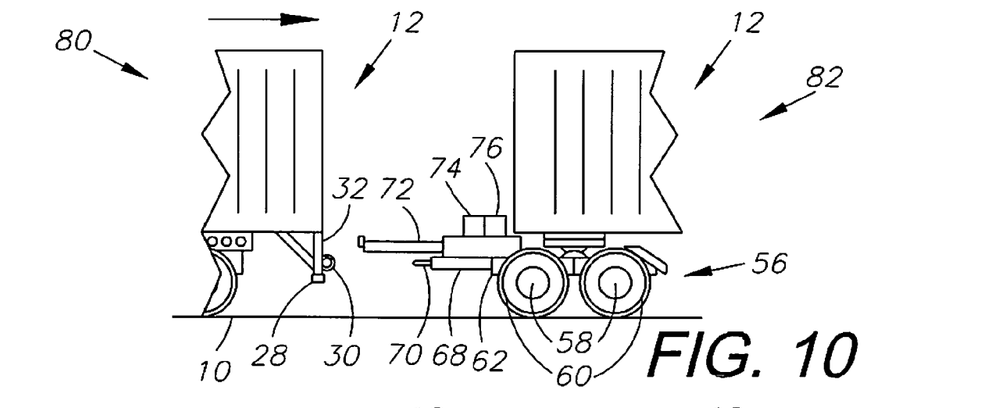
FIG. 10 is an enlarged side elevational view of the dolly assembly taken generally within circle 10 in FIG. 7.

Creation of trailer assemblies 84 is accomplished by first connecting a dolly 56 to a trailer 12 (FIGS. 2 and 6). A dolly 56 is pushed, either manually or mechanically such as by a tractor 36 or moved by engaging the electrical motor 65, toward a trailer 12 causing the pickup plate 66 to engage the kingpin 22. Several dolly 56 and trailer 12 combinations can be assembled in preparation for joining with other dolly-trailer assemblies 82, or with a tractor-trailer assembly 80. Next a tractor 36 is connected to a trailer 12 causing the pickup plate 50 to engage the kingpin 22 of the trailer 12. Assembly of a trailer assembly 84 occurs when a tractor-trailer assembly 80 backs toward a dolly-trailer assembly 82 whereby the receiver 32 on the bumper 28 of the trailer 12 is in front of, and within the reach of the hydraulic jack 72 on the dolly 56 (FIGS. 3, 7 and 10). The hydraulic jack 72 is extended engaging the receiver 32, and then retracted pulling the dolly-trailer assembly 82 toward the bumper 28 of the forward trailer 12 securely engaging the ring coupling 70 on the dolly 56 to the pintle hook 30 of the forward trailer 12 (FIGS. 4, 8 and 11). Hydraulic and electrical connections 34 are made between the trailers 12 and dollies 56 supplying lighting and braking power to the axle assemblies 14, 58 and recharging the batteries 74. Additional dolly-trailer assemblies 82 can be joined to the rearward-most dolly-trailer assemblies 82 as needed until the desired number of trailers 12 are assembled together into a trailer assembly 84 (FIGS. 5, 9 and 12).

IV. Railway Flatcars 90 and Powered Loading Ramps 120

Figure 14:
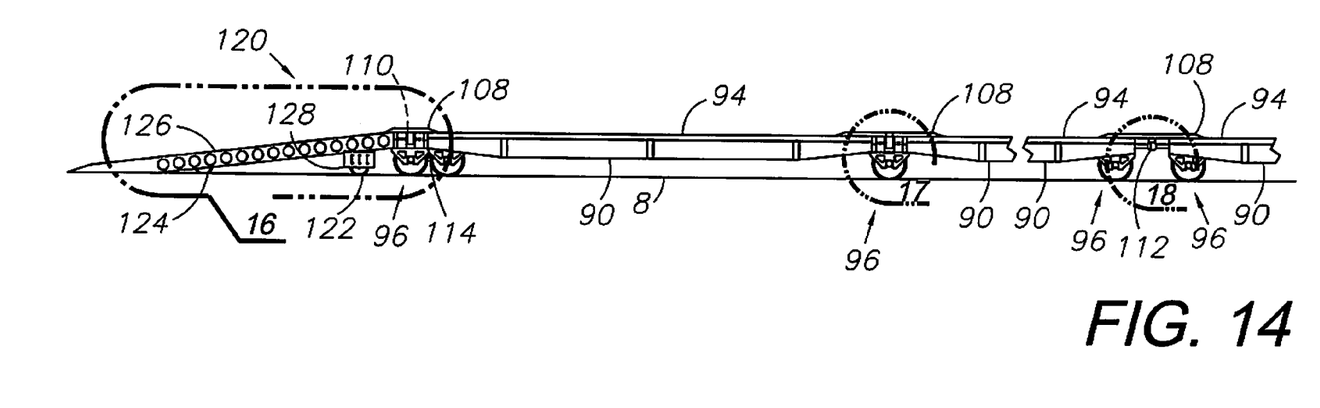
FIG. 14 is a side elevational view of a railcar assembly and movable railcar loading ramp of an intermodal transportation system embodying principles of the present invention.

Referring to FIG. 14, the railcar assembly 86 and a powered loading ramp 120 are shown and described. Each railway flatcar 90 consists of a narrow center frame 92 similar to a railway spine car adapted to receive a deck 94 that runs the length of the frame 92 having a width wide enough to accommodate trailer assemblies 84 thereon. Dual-axle bogies 96 are disposed at the ends of each flatcar 90. Referring to FIG. 17, each bogie 96 consists of frames 98 rotatably mounting an axle 100 having a flanged railway wheel 102 at each end for engaging the rails of the mainline 6 and side track 8. The wheels 102 have a diameter of approximately thirty-three inches providing a lower overall deck 94 height to conventional railway flatcars. A pair of bridge supports 104 connect each outer frame 98*a* with an inner frame 98*b* and provides support for the railcar 90 frame 92. A cross member 106 connected to the bogie 96 suspension 107 provides support for the pivot plate 108. Each railcar 90 of the railcar assembly 86 are interconnected by a positive slack-free connection (not shown) such as a spherical articulated coupling manufactured by Cardwell Westinghouse of Chicago, Ill. At the connections between the railcar assemblies 86, a pivot plate 108 in contact with the deck 94 overlaps the ends of the adjacent railcars 90 and is connected by a pivot pin 110 to the cross member 106. The pivot plate 108 spans the gap between the decks 94 of the railcars 90 permitting the trailer assemblies 84 to drive across the railcars 90 during the loading and unloading process. At the terminal ends 114 of each railcar assembly 86 is a bogie 96 and a conventional jaw coupler 112. The jaw coupler 112 joins the railcar assembly 86 to another railcar assembly 86 or to another car of a train. When joining two railcar assemblies 86 together, two cross ramps 118 span the gap between the decks 94 of the railcars 90 permitting the trailer assemblies 84 to drive across the railcars 90 unimpeded.

Loading and unloading of trailer assemblies 84 from the railcar assemblies 86 is facilitated by a self-powered movable loading ramp 120. Referring to FIG. 16, the movable ramp 120 consists of a ramp 126 mounting a pair of forward drive wheels 122 and trailing rear wheels 124. The wheels 122, 124 are dimensioned and located to provide a gradual incline to the ramp 126. The drive wheels 122 are operably connected to a power supply 128 for moving the ramp 120 along the side track 8 to the terminal end 114 of a railcar assembly 86. Two cross ramps 118 span the gap between the ramp 120 and the terminal end of the railcar assembly 86.

V. Loading Trailer Assemblies 84 onto Railcar Assemblies 86

Figure 21:
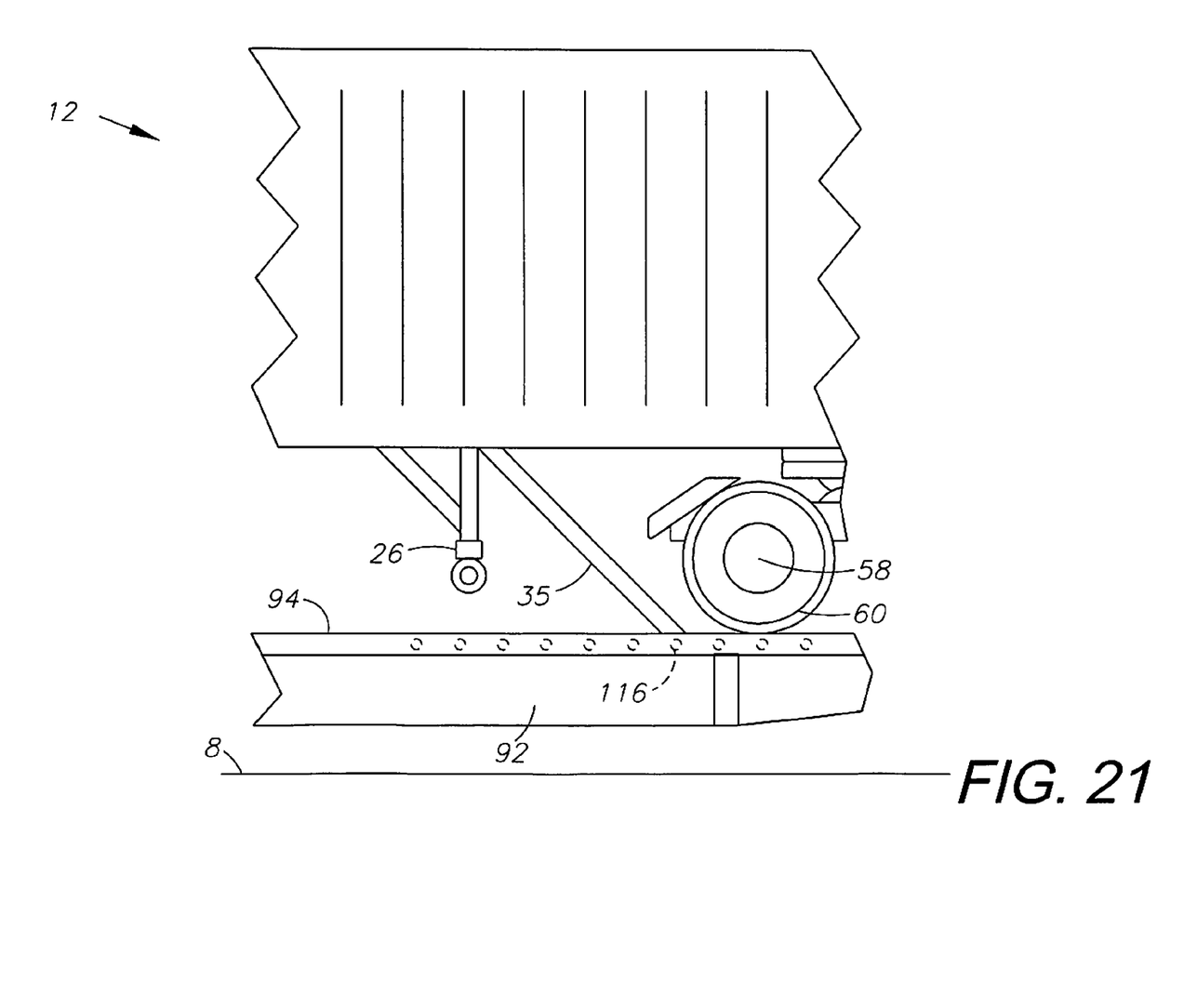
FIG. 21 is an enlarged view of the trailer tie-down assembly.

Referring to FIGS. 15, 19-21, loading and unloading trailer assemblies 84 onto railcar assemblies 86 is shown and described. A ramp 120 is positioned at one or more of the terminal ends 114 of the railcar assembly 86 for loading and unloading of the trailer assemblies 84. A trailer assembly 84 ready for transport using the intermodal transportation system 2 is driven up the ramp 126 and onto the railcar assembly 86 (FIG. 15). Although only two trailers 12 are shown in the instant example, numerous trailers 12 can be assembled into a trailer assembly 84 and driven onto the railcar assembly 86. The trailer assembly 84 is positioned on top of the railcars 90 whereby one trailer 12 is located on each railcar 90. The trailer assembly 84 remains connected together during transit. Each trailer 12 is secured to its respective railcar by tie-downs 35 depending from the trailer 12 rear end (FIG. 21). The tie-downs 35 attach to cross rods 116 within a channel 115 running the length of each railcar 90. The tires 44, 16 and 60 on the tractor 36, trailer 12, and dolly 56, respectively, are specialized tires allowing enough give and flex to absorb movement of the trailer assembly 84 on the railcar assembly 86 during movement of the train.

After a railcar assembly 86 has been loaded or unloaded, the ramps 120 are moved away from the terminal ends 114 and the railcar assembly 86 can be moved from the side track 8 and assembled into a train.

III. Alternative Embodiment or Aspect Intermodal Transportation System 2

Figure 22:
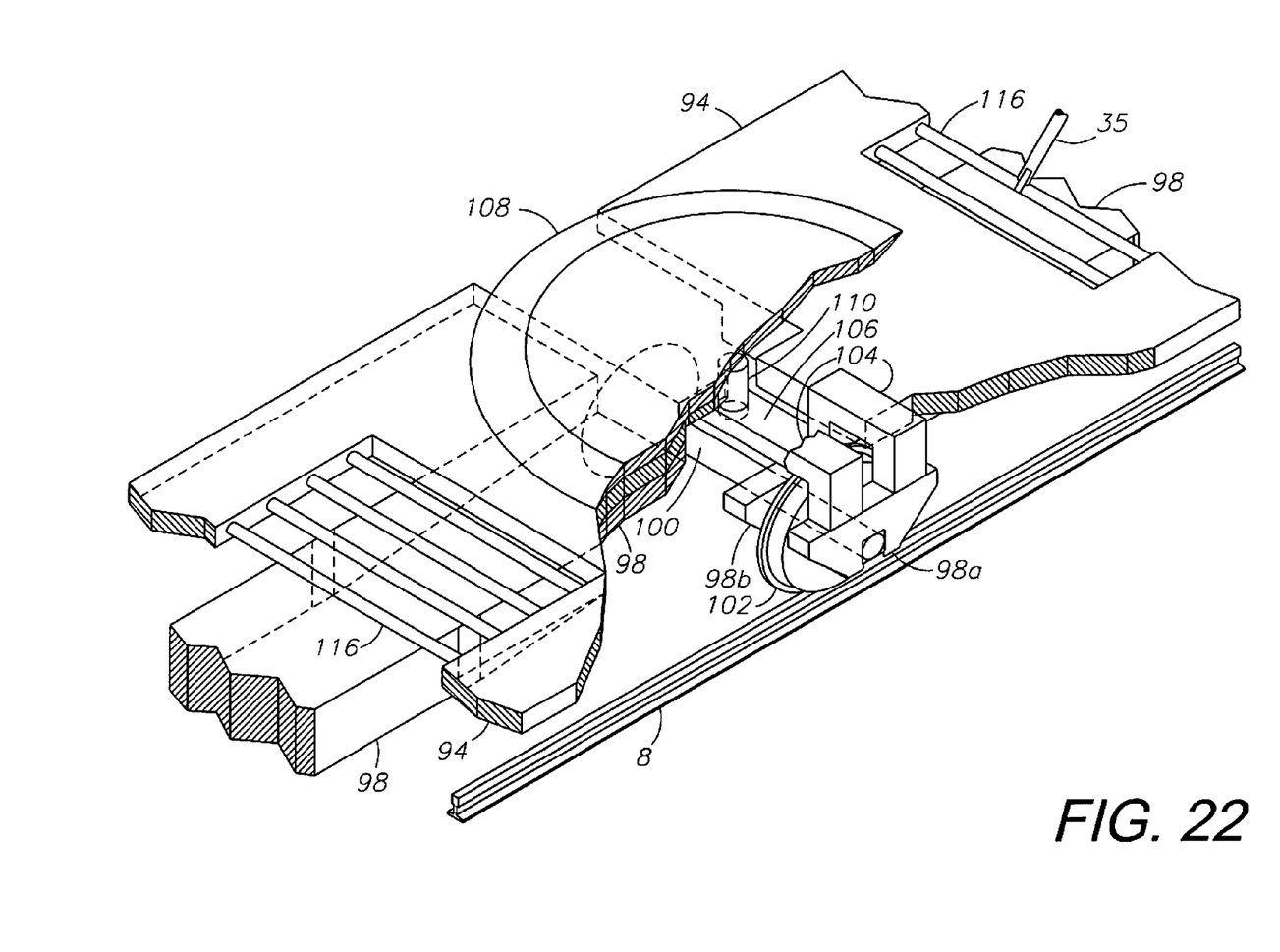
FIG. 22 is an isometric sectional view of the railcar assembly.
Figure 23:
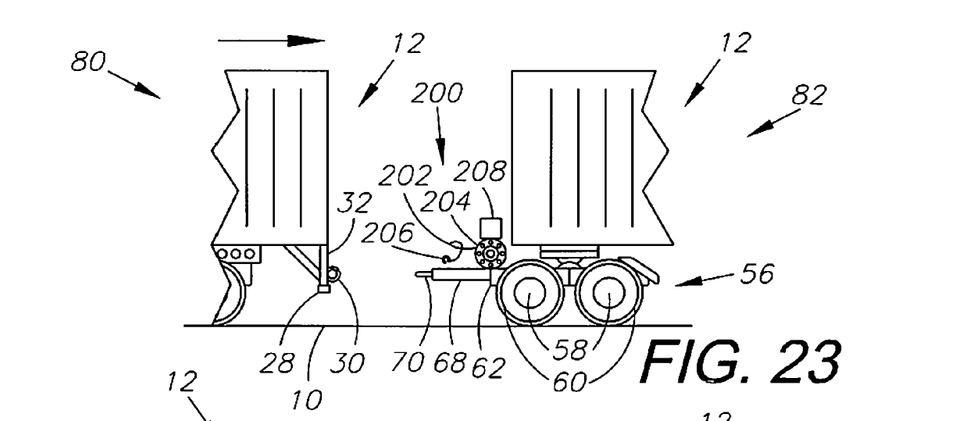
FIG. 23 is a side elevational view of an alternative embodiment dolly-trailer assembly whereby the tractor-trailer assembly is moved toward the dolly-trailer assembly.
Figure 24:
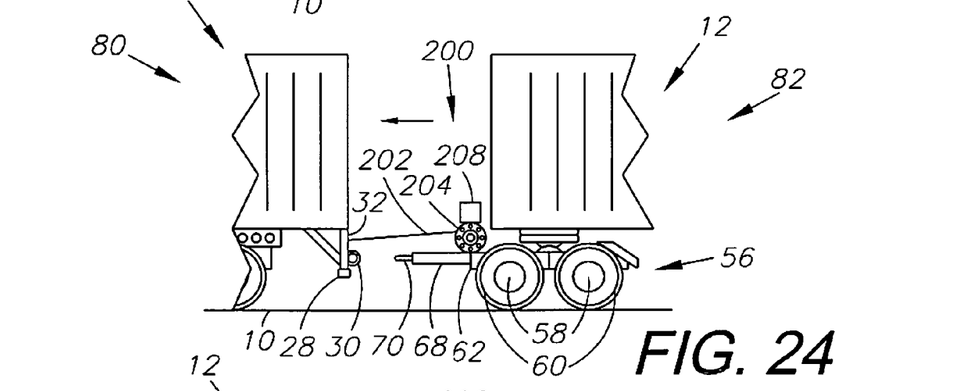
FIG. 24 is a side elevational view of an alternative embodiment dolly-trailer assembly whereby the dolly-trailer assembly is drawn toward the tractor-trailer assembly.
Figure 25:
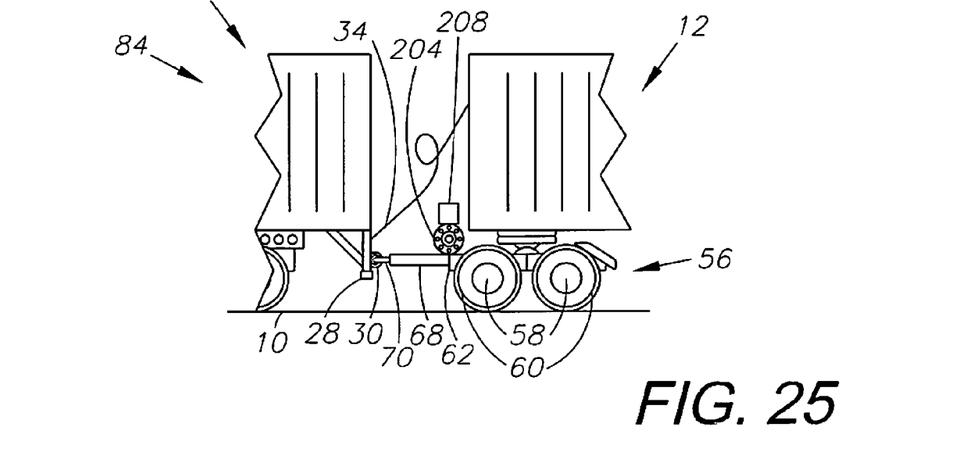
FIG. 25 is a side elevational view of an alternative embodiment dolly-trailer assembly whereby the dolly-trailer assembly is connected to a tractor-trailer assembly.

An intermodal transportation system 2 comprising another embodiment or aspect of the present invention is shown in FIGS. 23-25, and includes a dolly 56 having an electrical winch 200 for connecting a dolly-trailer assembly 82 to the rear of a trailer 12. The winch 200 consists of a cable 202 connected to an electric motor 204 having a hook 206 at the opposite end. A power supply such as a battery 208 permits independent operation of the winch 200 without a need for a power connection to the tractor 36. The winch 200 operates in the same fashion as the hydraulic jack 72 described above regarding assembly of a tractor-trailer assembly 80 and a dolly-trailer assembly 82. A tractor-trailer assembly 80 is backed up close to a dolly-trailer assembly 82, and the hook 206 is secured to the receiver 32 in the bumper 28 of the trailer 12 (FIG. 22-23). The winch 204 retracts the cable 202 pulling the dolly-trailer assembly 82 toward the bumper 28 of the forward trailer 12 securely engaging the ring coupling 70 on the dolly 56 to the pintle hook 30 of the forward trailer 12 (FIG. 24). Air and electrical connections 34 are made between the trailers 12 and dollies 56 supplying lighting and braking power to the axle assemblies 14, 58 and recharging the battery 208. Additional dolly-trailer assemblies 82 can be joined together as described above.

IV. Alternative Embodiment or Aspect Intermodal Transportation System 302

Figures 26, 27:
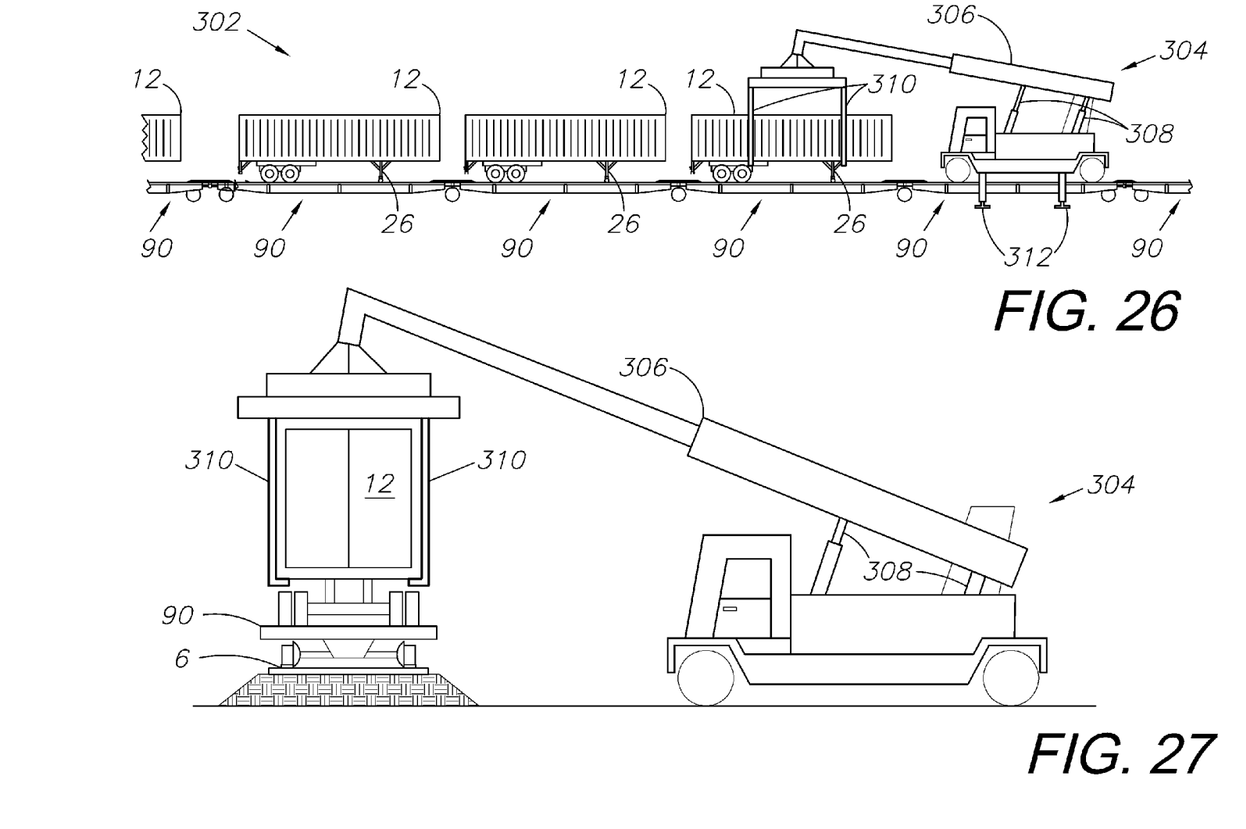
FIG. 26 is a side elevational view of an alternative embodiment intermodal transportation system including a crane-truck used for loading and unloading freight trailers.
FIG. 27 is an elevational view of the alternative embodiment of FIG. 26 wherein the crane truck is located alongside the railway.

An intermodal transportation system 302 comprising another alternative embodiment of the present invention is shown in FIGS. 26-27, and includes a crane truck 304, such as the Kalmar Model DRF reachstacker crane truck. The crane truck 304 includes a crane main arm 306, crane arm hydraulic supports 308, crane lift arms 310, and crane hydraulic pods 312.

FIG. 26 demonstrates the unloading of freight trailers 12 from a railcar 90 using a crane truck 304 loaded onto the interconnected railcars 90. The crane truck 304 is capable of lifting the trailers 12 with the crane lift arms 310 and placing the trailers on the ground adjacent to the track. The crane truck 304 then advances along the interconnected railcars 90 and lifts and unloads the next trailer. This pattern can continue until all trailers are unloaded. During this unloading process, hydraulic pods 312 connected to the crane truck 304 descend on either side of the railcar 90 and support the crane truck 304 from the ground.

FIG. 27 demonstrates the loading or unloading of freight trailers 12 from a railcar 90 while the crane truck 304 is on the ground adjacent to the rails 6. In this particular method of loading or unloading, the crane truck 304 travels adjacent to the railcars 90 without being loaded onto the actual railcars.

It will be appreciated that the components of the intermodal transportation system 2 can be used for various other applications. Moreover, the components of the intermodal transportation system 2 can be fabricated in various sizes and from a wide range of suitable materials, using various manufacturing and fabrication techniques.

It is to be understood that while certain aspects of the invention have been shown and described, the invention is not limited thereto and encompasses various other embodiments and aspects.

Having thus described the invention, what is claimed as new and desired to be secured by Letters Patent is:

1. An intermodal transportation system for moving of freight, the system comprising:
  a plurality of individual freight trailers, each said freight trailer including a kingpin connector;
  a railcar assembly comprised of a plurality of interconnected railcars adapted for transporting said interconnected freight trailers;
  a locomotive or other means adapted to transport said railcars across railway tracks; a plurality of self-powered dollies adapted for engaging the kingpin connectors of said freight trailers; a self-powered moveable ramp adapted for loading said interconnected freight trailers onto said interconnected railcars; and
  a tractor adapted for hauling freight trailers;
  wherein said interconnected freight trailers are connected to said self-powered dollies to form a series of interconnected freight trailers, said tractor is appended to one end of said series of trailers, and said tractor is arranged to pull said trailers onto said interconnected railcars via said self-powered moveable ramp.

2. The system according to claim 1, wherein said railcar assembly comprises two or more railway spine cars including flat deck.

3. The system according to claim 2, wherein said railway spine cars are interconnected in a semi-permanent fashion using a positive slack-free connection.

4. The system according to claim 3, wherein said railcars include a channel running the length of each railcar, the channel adapted for securing the self-powered dollies, interconnected freight trailers, and tractor onto said railcars.

5. The system according to claim 4, including:
  pivot plates spanning a gap between interconnecting railcars of the railcar assembly; said pivot plates being adapted for allowing the railcars to articulate as turns in the railroad track are encountered; and
  said pivot plates being adapted for allowing the tractor and interconnected freight trailers to pass from one interconnected railcar to an adjacent interconnected railcar.

6. The system according to claim 1, including an assembly area for loading or unloading said freight trailers.

7. The system according to claim 6, including:
  a main railway track comprised of train rails in parallel relation suitably spaced for receiving wheels of said locomotive and railcars;

a side railway track branching from said main railway track and leading to the assembly area; and a paved roadway adapted for tractor and trailer traffic, said roadway running between the rails of said side railway track and paved to a rail head level of said side railway track.

8. The system according to claim 1, wherein said freight trailers are suitable for interstate highway transportation of freight.

9. An intermodal transportation system for moving of freight, the system comprising:

- a plurality of individual freight trailers suitable for interstate highway transportation of freight, each said freight trailer including a kingpin connector;
- a tractor adapted for hauling said freight trailers, the tractor suitable for interstate highway transportation;
- a railcar assembly comprised of a plurality of interconnected railcars adapted for transporting said interconnected freight trailers;
- a main railway track comprised of train rails in parallel relation suitably spaced for receiving wheels of locomotive and railcars;
- a side railway track branching from said main railway track and leading to an assembly area; and
- a paved roadway adapted for tractor and trailer traffic, said roadway running between the rails of said side railway track and paved to a rail head level of said side railway track;
- the assembly area configured for loading or unloading said freight trailers onto said railcar assembly; said railcars comprising railway spine cars including a flat deck;
- said railcars being interconnected in a semi-permanent fashion using positive slack-free connectors;
- a locomotive or other means adapted to transport said railcars across railway tracks; a plurality of self-powered dollies adapted for engaging the kingpin connectors of said freight trailers;
- said railcars including a channel running the length of each railcar, the channel adapted for securing the self-powered dollies, interconnected freight trailers, and tractor onto said railcars;
- pivot plates spanning a gap between interconnecting railcars of the railcar assembly;
- said pivot plates being adapted for allowing the railcars to articulate as turns in the railroad track are encountered and for allowing the tractor and interconnected freight trailers to pass from one interconnected railcar to an adjacent interconnected railcar;
- a self-powered moveable ramp adapted for loading said interconnected freight trailers onto said interconnected railcars; and
- wherein said interconnected freight trailers are connected to said self-powered dollies to form a series of interconnected freight trailers, said tractor is appended to one end of said series of trailers, and said tractor is arranged to pull said trailers onto said interconnected railcars via said self-powered moveable ramp.

* * * * *